(12) United States Patent
Braillard

(10) Patent No.: US 12,529,610 B2
(45) Date of Patent: Jan. 20, 2026

(54) SYSTEM FOR DETERMINING A HEAT EXCHANGE COEFFICIENT

(71) Applicant: COMMISSARIAT A L'ENERGIE ATOMIQUE ET AUX ENERGIES ALTERNATIVES, Paris (FR)

(72) Inventor: Olivier Braillard, Venelles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 353 days.

(21) Appl. No.: 18/034,646

(22) PCT Filed: Nov. 3, 2021

(86) PCT No.: PCT/EP2021/080473
§ 371 (c)(1),
(2) Date: Apr. 28, 2023

(87) PCT Pub. No.: WO2022/101067
PCT Pub. Date: May 19, 2022

(65) Prior Publication Data
US 2023/0400365 A1 Dec. 14, 2023

(30) Foreign Application Priority Data
Nov. 12, 2020 (FR) ........................................ 2011609

(51) Int. Cl.
*G01K 17/20* (2006.01)
*G01K 7/16* (2006.01)
(Continued)

(52) U.S. Cl.
CPC ............... *G01K 17/20* (2013.01); *G01K 7/16* (2013.01); *G01K 13/20* (2021.01); *G01K 17/06* (2013.01)

(58) Field of Classification Search
CPC ........ G01K 17/20; G01K 17/06; G01K 13/02; G01K 7/16
(Continued)

(56) References Cited

U.S. PATENT DOCUMENTS 5,406,246 A  4/1995  Friese et al.

FOREIGN PATENT DOCUMENTS

| CN | 116593526 A | * | 8/2023 | ............. G01N 25/20 |
| EP | 3 106 852 A1 | | 12/2016 | |

(Continued)

OTHER PUBLICATIONS

Braillard, et al., "Thermal load determination in the mixing TEE impacted by a turbulent flow generated by two fluids at large gap of temperature", 13th International Conference on Nuclear Engineering, May 2005.

*Primary Examiner* — Mirellys Jagan
(74) *Attorney, Agent, or Firm* — BakerHostetler

(57) ABSTRACT

A system for determining a coefficient of heat exchange between a fluid and a medium at a surface in contact with the fluid, comprising a temperature measurement device comprising: a multilayer structure comprising: four thin ceramic layers, and three metal tracks, a resistive temperature sensor attached to the multilayer structure and intended to be in contact with the fluid to measure a fluid temperature $T_F$, the system further comprising a computer.

12 Claims, 8 Drawing Sheets

(51) Int. Cl.
*G01K 13/20* (2021.01)
*G01K 17/06* (2006.01)

(58) Field of Classification Search
USPC .................................................. 374/43, 44
See application file for complete search history.

(56) References Cited

FOREIGN PATENT DOCUMENTS

| | | | | |
|---|---|---|---|---|
| EP | 3 339 828 A1 | 6/2018 | | |
| FR | 2 940 435 A1 | 6/2010 | | |
| FR | 3110242 A1 * | 11/2021 | ............. | G01N 25/18 |
| WO | WO-2012049417 A2 * | 4/2012 | ............. | G01N 25/18 |

* cited by examiner

SYSTEM FOR DETERMINING A HEAT EXCHANGE COEFFICIENT

CROSS-REFERENCE TO RELATED APPLICATIONS

This application is a National Stage of International patent application PCT/EP2021/080473, filed on Nov. 3, 2021, which claims priority to foreign French patent application No. FR 2011609, filed on Nov. 12, 2020, the disclosures of which are incorporated by reference in their entirety.

FIELD OF THE INVENTION

The present invention concerns an improved system for determining a heat exchange coefficient.

BACKGROUND

Knowing the coefficient of heat exchange between a wall and a fluid, for example between a pipe wall and a fluid that is flowing in the pipe, is essential for calculating the exchanges of heat between the fluid and the wall.

In addition to knowing the quantity of energy that is transferred to the wall by the fluid, the heat exchange coefficient makes it possible to indicate if that transfer is efficient or not, or at least corresponds to a given value, an upper or lower limit, or a required range of values. In some cases the aim will be to amplify it (heat exchangers) and in other cases the aim will be to reduce it (heat loss from buildings).

The heat exchange coefficient is routinely used at the design stage, for example to determine the size of the surfaces of the heat exchangers and to calculate the heat powers transmitted by a fluid.

The heat exchange coefficient is also used for detection, knowing the heat exchange coefficient making it possible to characterize a malfunction such as, for example, the onset of drying out, the onset of cavitation or the presence of non-condensable substances.

For example, in a plate-type or tube-type exchanger the aim is to optimize the transfer of heat between the two fluids and at the design stage an exchange coefficient of at least 20 kW/m$^2$/° C. may be aimed at. Moreover, over time the heat exchange coefficient of an exchanger can decrease significantly, for example if it becomes soiled. This can constitute very valuable information for a designer, a manufacturer or a user of a heat exchanger, for example so as to know the frequency of cleaning and/or of maintenance.

In contrast, in other fields such as that of dwellings where the aim is to insulate to limit heat losses, the exchange coefficient looked for must be low to very low.

By design, the thermal resistances of walls, and in particular of insulation, do not change over time and their exchange coefficient therefore also remains constant. Only the external exchange coefficient is sensitive to the conditions of the surrounding atmosphere with or without the presence of wind and humidity. It is this exchange coefficient that the aim is to measure and/or to minimize, its impact being significant in the global exchange coefficient. The value of the external exchange coefficient may evolve between 0.2 W/m$^2$/° C. (with no wind) and 25 W/m$^2$/° C. (10 m/s wind). The highest values may cause heat losses that can reach a multiplication factor of 1.7, i.e. a 70% increase in the global heat loss.

The convective exchange coefficient is not measured directly by means of a sensor. To determine it, exchange correlation mathematical models are used (Colburn, Dittus-Bolter or Rosenhow model) that necessitate a knowledge of certain characteristics of the fluid, such as the velocity, the viscosity, the temperature, etc.

The difficulty, or even the impossibility, of obtaining a heat exchange coefficient using correlation models is encountered in numerous industrial applications such as, for example, mixing turbulent fluids with a large temperature difference (thermal fatigue), the presence of non-condensable substances, the presence of singularities, for example when a wall encounters fluid turbulence that may lead to drying out.

French patent application FR2940435A1 entitled "Dispositif de determination de coefficient d'echange thermique et procédé associe" [Heat exchange coefficient determination device and associated method] is a particularly advantageous response to the requirement of numerous industrial applications in which the exchange correlation models are unsuitable. It describes a system for determining a coefficient of heat exchange between a fluid and a wall at a point $P_N$ on a surface of the wall in contact with the fluid, comprising:

a temperature measuring device comprising:
two wall temperature sensors, a first temperature sensor measuring a first temperature value $T_{C1}$ of the wall at a point $P_1$ and a second temperature sensor measuring a second temperature value $T_{C2}$ of the wall at a point $P_2$ substantially aligned with the point $P_1$ along a line normal to the surface at the point $P_N$, the point $P_1$ being the closest to the surface of the wall, and
a fluid temperature sensor measuring a temperature value $T_F$ of the fluid at a point $P_F$ of the fluid substantially aligned with the points $P_1$ and $P_2$, and
a computer comprising:
first means for calculating, from the temperature values $T_{C1}$ and $T_{C2}$, a temperature value $T_P$ of the wall and a heat flow $\Phi$ given by the equation:

$$\Phi = -\mu \times \mathrm{grad}(T_{C1} - T_{C2})$$

where $\lambda$, is the thermal conductivity of the wall, and
second means for calculating, from the fluid temperature $T_F$, the temperature $T_P$ and the thermal flow $\Phi$ the heat exchange coefficient h in the form:

$$h = \Phi / (T_F - T_P)$$

The temperature $T_P$ is calculated, for example, by a reverse method based on using the flow determined continuously. This method is described in the document entitled "*Thermal load determination in the mixing tee impacted by a turbulent flow generated by two fluids at large gap of temperature*" (Olivier Braillard, Yvon Jarny, Guillaume Balmigere; 13th International Conference on Nuclear Engineering; Beijing, China; 16-20 May 2005; ICONE 13-50361).

FIG. 1 corresponds to FIG. 1 of the patent application FR2940435A1 and depicts a temperature measurement device DT comprising two thermocouples D1, D2 placed in the wall P of the pipe as close as possible to the fluid and adapted to measure the temperature at respective points $P_1$ and $P_2$ on the wall (which correspond to the free ends of the thermocouples D1 and D2) and a fluid thermocouple DF extending into the fluid F and adapted to measure the temperature at a point $P_F$ of the fluid that corresponds to the free end of said fluid thermocouple. The points $P_1$, $P_2$ and $P_F$ are aligned along a line normal (in the direction OZ), at a point $P_N$, to the surface of the wall that is in contact with the fluid. The thermocouples D1, D2 and DF are placed close to the surface of the wall P and the fluid thermocouple DF is oriented to face the flow S of the fluid F (flow in the direction OX).

The thermocouples D1 and D2 are fixed into a cylindrical structure formed by assembling two half-moons L1, L2, that structure being itself fixed into a main body 1, and the line joining the points $P_1$, $P_2$ and $P_F$ coincides with the axis of the cylindrical structure formed by the two half-moons L1, L2. The thermocouples D1 and D2 pass through the main body 1 in a sheath G formed in the main body 1 to an opening that is configured to receive the cylindrical structure while the fluid thermocouple DF passes through the main body 1 in a through-hole 4 of very small diameter formed in said main body to reach the interior of the pipe in which the fluid F circulates.

The main body 1 of the temperature measuring device is integrated into a cavity in the wall P formed for this purpose, thanks to fitting shims 5 in order to adjust the position of the face of the measuring device intended to be in contact with the fluid and a fixing means such as a nut E, the measuring device being sealed by an O-ring 3.

Each thermocouple D1, D2 and DF is formed by two metal wires (of two different materials), the diameter of each wire being at least equal to 25 µm.

The thermocouple D1, which is closest to the fluid, is located (point $P_1$) at a distance d1 from the surface of the wall P typically between 10 µm and 3 mm, for example 300 µm. The thermocouple D2, which is farthest from the fluid, is located (point $P_2$) at a distance d2 from the surface of the wall P typically between 100 µm and 1 cm, for example 500 µm.

The fluid thermocouple DF is located at a distance df from the surface of the wall P typically between 10 µm and 1 cm, for example 2000 µm.

The temperature measuring device described enables determination of a temperature gradient on the basis of the equation yielding the heat flow density in the direction OZ:

$$\varphi = -\lambda \times \mathrm{grad}(T_{C1} - T_{C2}) = -\lambda \Delta T / \Delta z$$

where $\lambda$ is the thermal conductivity of the wall.

It emerges from this equation that this temperature gradient measurement method is not precise and reliable unless the measurement points $P_1$ and $P_2$ are sufficiently far apart to obtain a precise measurement of the temperature gradient. In other words, for the same heat flow linked to the temperature gradient $\Delta T/\Delta x$, the temperature difference between $P_1$ and $P_2$ will be higher, and therefore more precise, with a greater distance between $P_1$ and $P_2$. A minimum distance between two measurement points impacts the dimensions of the device, as explained hereinafter.

FIGS. 2A and 2B depict a particular temperature measuring device for a heat exchange coefficient determination system. FIG. 2A corresponds to a section in the direction OXZ of FIG. 1, with the difference that it further comprises a third thermocouple inside the wall P the end $P_3$ of which is aligned with the points $P_1$, $P_2$ and $P_F$. The third thermocouple is even farther from the fluid F than the second thermocouple D2. It is placed at a distance from the surface of the wall P typically between 1 mm and 3 cm from the fluid, for example 2400 µm. FIG. 2B corresponds to a section of the cylindrical structure formed by the two half-moons L1, L2 in the plane OXY in which are seen the welds between the two half-moons and the welds of each half-moon to the main body 1.

FIG. 2A more precisely depicts a half-moon L1 in which channels have been etched to receive the six metal wires of the three thermocouples. The two wires D11 and D12 form the thermocouple D1, the two wires D21 and D22 form the thermocouple D2 and the two wires D31 and D32 form the thermocouple. The wires of the thermocouples extend in the sheath G and then in the etched guides L11 and L12 on either side of a central zone L13 of the half-moon to emerge at the level of a cavity L14 also etched in the half-moon. The wires of each thermocouple are therefore routed in such a manner as to be disposed at the edge of the etched cavity L14 facing them in the direction OX in a symmetrical manner relative to the direction OZ. This configuration enables the two wires of each thermocouple to be oriented perpendicularly to the heat flow Φ and to be precisely placed one facing the other and the distances to be precisely conformed to (which would not be possible with a configuration with wires placed straight in the direction OZ). This configuration is necessary for measuring a very precise temperature gradient in the direction OZ, as required in the preferred applications of the invention.

To the extent that the two wires of each thermocouple are not welded together directly but via the intermediate part formed by the half-moon and its cavity, the distance between the two wires must be small to sense the same temperature and not skew the measurement, but sufficiently large to channel toward the thermocouples the heat flow Φ perpendicular to the circulation of fluid F. The distance d4 between the two wires of each thermocouple (corresponding to the width of the etched cavity), as determined by the inventor, is therefore of the order 1 millimeter.

This configuration necessitates each thermocouple wire to follow a radius of curvature r that is at least 0.5 millimeter. In order to enable all the thermocouple wires to adhere to this radius of curvature (each wire having a diameter of at least 25 µm), the inventor has determined that the width d5 in the direction OX of each zone between the cavity L14 and the edge of the half-moon in contact with the body 1, which corresponds to the zone in which the wires are routed, is at least equal to 1.5 millimeters.

The diameter of a half-moon and therefore of the cylindrical structure formed by the two half-moons L1, L2 is therefore at least equal to 4 millimeters.

Moreover, a through-hole 4 is formed in the main body 1 to enable the fluid thermocouple DF to pass through said main body as far as the interior of the pipe. The diameter of the thermocouple DF typically being 0.5 millimeter, the hole 4 must have a diameter of at least equal to 0.5 millimeter.

It has therefore been deduced that the outside diameter of the main body 1 and therefore of the measuring device must be at least equal to 6 millimeters.

To summarize, the features of this kind of temperature measuring device for a heat exchange coefficient determination system are generally as follows:

the diameter (or the thickness) of the device is at least 6 mm;

the wall thermocouples each comprise two wires, the diameter of each wire being at least 25 µm;

the fluid thermocouple generally has a diameter of at least 0.3 mm or even at least 0.5 mm.

Moreover, the material of the main body is identical or similar to that of the wall so as to have substantially the same thermal behavior (same conductivity and same diffusivity) as the wall.

A device of this kind as thick as this can therefore only be installed in thick pipework and generally necessitate drilling the wall and/or producing a boss on the wall in order to install it.

This kind of device is generally manufactured one by one with painstaking operations: machining, welding of the thermocouple wires, sealing weld . . . . This kind of device does not lend itself to mass production. The manufacturing lead time is generally long and its manufacturing cost is equally high (of the order of 10 k€).

Moreover, the temperature resistance of this kind of device is less than or equal to 700° C.

The aim is a significant reduction in the dimensions of a heat exchange coefficient determination device, and in particular reduction of its thickness in order to be able to take measurements in thin, exiguous walls of small size, preferably without having to modify the wall (in particular without drilling it or providing a boss on the wall), and to achieve this while preserving the same measurement accuracy as for a heat exchange coefficient determination system as described above, or even improving it.

The preference is for a heat exchange coefficient determination device of this kind that is able to withstand a temperature exceeding 700° C.

The patent application EP3106852A1 describes a millimeter scale heat flow sensor that is chemically and thermally resistant and mechanically robust and has a low thermal inertia. The heat flow sensor consists of thermoelectric materials superposed on one another with thermoelectric junctions between the layers of thermoelectric materials. Moreover, conductive wires at each thermoelectric junction enable acquisition of the electric signals from each thermoelectric junction independently of one another, the electric thermoelectric junction signals acquired being transmissible to the data processing device to determine heat flow data. The thermoelectric materials have different Seebeck coefficients so as to form thermocouple thermoelectric junctions.

On the one hand the above patent application does not describe a heat exchange coefficient sensor in that it does not provide for measurement in a fluid. A fortiori, this sensor is therefore not designed to produce dynamic measurements, that is to say with a flow of fluid in a pipe. On the other hand the above patent application aims to produce thermocouples undoubtedly of millimeter size but which are known to have a low sensitivity, of the order of 40 μV/° C., which necessitates amplification of the signal.

SUMMARY OF THE INVENTION

The invention aims to overcome these disadvantages of the prior art mentioned above.

To be more precise, the invention aims to provide a heat exchange coefficient determination system of millimeter or even sub-millimeter size that can in particular be installed on a thin wall (thickness of the order of 1 millimeter, for example between 1 and 5 mm, even between 1 and 3 mm, or further between 1 and 2 mm) whilst maintaining the same measurement accuracy or even improving it. A heat exchange coefficient determination system is looked for that does not necessitate intrusive integration (mechanically and thermally) in a wall or more widely in a support.

There is also looked for a system of this kind that can be installed on a wide variety of supports. The intended supports are not limited to a fluid pipework wall and, without this being limiting on the invention, may be: walls of exchangers, of metal structures (in industry), of walls or partitions to evaluate energy losses (in dwellings and public buildings), garments, for example so-called "intelligent" garments for exchange regulation measures (sport, armed services). Also looked for is the ability to measure quantitatively in terms of power (lost or acquired) the effect of temperature felt on the skin of a person (weather).

For example, the aim is to measure transfers of heat in a heat exchanger in order to evaluate the thermal performance locally and to enable more precise specification of the areas where the transfer of heat is not the optimum and can be improved. Characteristic walls dedicated to heat exchange in exchangers can be thin, of the order of 1 millimeter thick, for example between 1 and 5 mm, even between 1 and 3 mm or further between 1 and 2 mm, for example.

A heat exchange coefficient determination system is looked for that is preferably able to withstand a temperature greater than 700° C., typically between 700° C. and 1000° C.

Good measurement accuracy is looked for, as much in static as in fluid dynamic.

There is further looked for a heat exchange coefficient determination system that is simple and rapid to manufacture, of low cost and mass produced.

A first object of the invention is a system for determining a coefficient of heat exchange between a fluid and a support at a surface of the support in contact with the fluid, characterized in that it comprises a temperature measurement device extending in a longitudinal direction and comprising:
a multilayer structure including:
at least four thin ceramic layers and
at least three metal tracks, each track being positioned between two thin layers and integrated into the thickness of one of the two layers;
each track being adapted to be connected to an electrical power supply means and to a resistance measurement means so as to form a resistive probe able to measure a temperature $T_{P1}$, $T_{P2}$, $T_{P3}$ in a measurement plane,
the metal tracks thus forming a plurality of measurement planes parallel to one another and substantially aligned in the direction perpendicular to the surface; and
a resistive temperature probe attached to the multilayer structure and intended to be in contact with the fluid so as to measure a fluid temperature $T_F$;
the system further comprising a computer including:
first means for calculating from temperature values $T_{P1}$, $T_{P2}$, $T_{P3}$ measured by the at least three metal tracks a mean wall temperature value $T_P$ and a heat flow density $\varphi$; and
second means for calculating a heat exchange coefficient h from the fluid temperature $T_F$, the mean wall temperature $T_P$ and the heat flow density $\varphi$.

According to the invention, a thin layer is defined as being a layer the thickness of which is the order of a hundred to a few hundred micrometers, for example between 100 and 300 μm.

The multilayer structure is intended to be in contact with the support, and to be more precise with the surface of the support that is in contact with the fluid.

The invention therefore enables a heat exchange coefficient determination system to be obtained of millimeter or even sub-millimeter size that can in particular be installed on a thin wall, and more broadly on a wide variety of supports. The measurement device being simply fixable to a support, for example glued to or adhered to said support, it enables mechanically intrusive integration to be avoided. The ceramic layers may further be made of materials adapted to limit thermal intrusion.

Moreover, the temperature measuring device being mainly made of ceramic, the temperature that the measuring device is able to withstand can exceed 700° C.

The heat exchange coefficient determination system according to the invention may further have one or more of the following features separately or in all possible technical combinations.

At least one metal track is preferably configured to form at least one high-sensitivity resistive probe and corresponds to a sensitivity greater than or equal to 0.3 Ω/° C. and preferably greater than or equal to 1.3 Ω/° C.

At least one metal track is preferably configured to form an initial resistance $R(T_0)$ greater than or equal to 300 Ω. This enables adjustment of the temperature measurement sensitivity.

The multilayer structure may comprise more than four thin ceramic layers and more than three metal tracks, each track being positioned between two thin layers and being integrated into the thickness of one of the two layers.

At least one metal track may be made of platinum, silver, nickel or a metal alloy.

The various tracks are preferably made of the same material, preferably chosen from one or more of the materials cited hereinabove. This in particular enables manufacture of the device to be facilitated.

Alternatively, the various tracks may be made of different metals, preferably chosen from one or more of the materials cited hereinabove.

At least one thin ceramic layer is made of alumina ($Al_2O_3$), zirconia ($ZrO_2$), an alumina/zirconia composite material, aluminum nitride (AlN), silicon nitride ($Si_3N_4$) or beryllium oxide (BeO). Such materials generally make it possible to minimize the thermal effects of the presence of the measuring device (minimizing thermal intrusion), in particular when the support is made of a stainless steel.

The various ceramic layers are preferably all made of the same material, in particular one of the materials cited hereinabove, in order to facilitate the manufacture of the device and to obtain better thermal behavior.

Alternatively, the various ceramic layers may be made of different ceramic materials, in particular a plurality of the materials cited hereinabove.

In accordance with a preferred embodiment, at least one thin ceramic layer has a thickness less than or equal to 300 μm, preferably less than or equal to 200 μm, and preferably all the thin ceramic layers.

In particular the thin ceramic layer intended to be in contact with the surface of the support has a thickness of at least 150 μm.

In accordance with one embodiment, at least one end of the multilayer structure in the longitudinal direction is extended by a bevel shape enabling progressive reduction of the thickness of said structure at the level of said end, which is preferably the end intended to face the flow of fluid.

In accordance with one particular embodiment, the two ends of the multilayer structure are extended by a bevel shape in the longitudinal direction corresponding to the direction of circulation of the fluid.

In accordance with one embodiment, the system comprises at least one electrical power supply means and at least one resistance measurement means connected to each metal track and preferably to the resistive fluid temperature probe.

In accordance with one particular embodiment, each metal track is connected on the one hand to the electrical power supply means via a power supply circuit and on the other hand to the resistance measurement means via a measurement circuit, by means of the electrical power supply means, so as to form a 4-wire connection.

BRIEF DESCRIPTION OF THE DRAWINGS

Other features and advantages of the invention will become apparent through the following description given by way of non-limiting illustration and with reference to the appended figures, in which.

In all of these figures identical references may designate identical or analogous elements.

Moreover, the various parts represented in the figures are not necessarily to a uniform scale, in order to make the figures easier to read.

DETAILED DESCRIPTION

Figure 1:
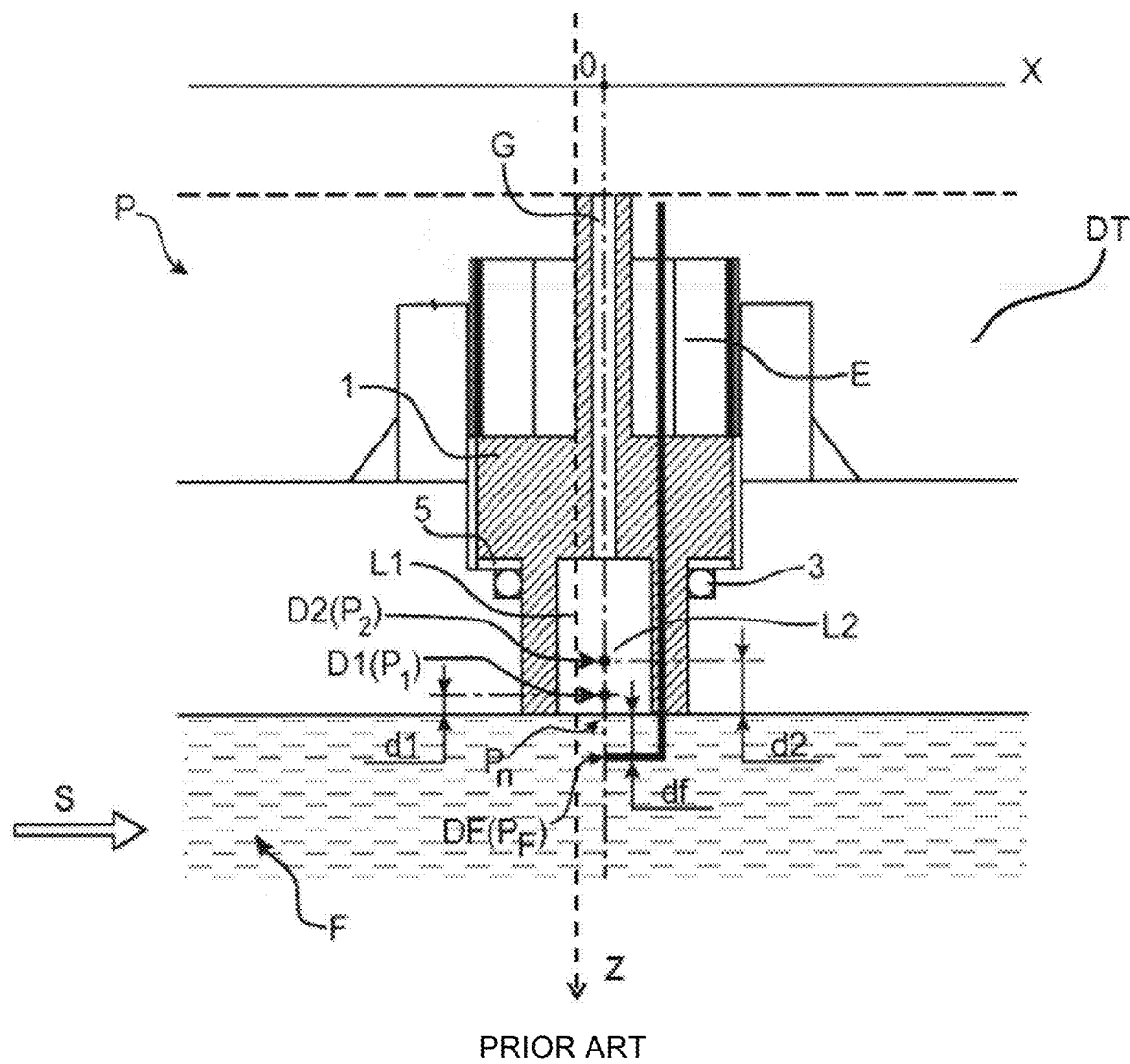
FIG. 1 depicts a prior art heat exchange coefficient determination system.
Figure 2A:
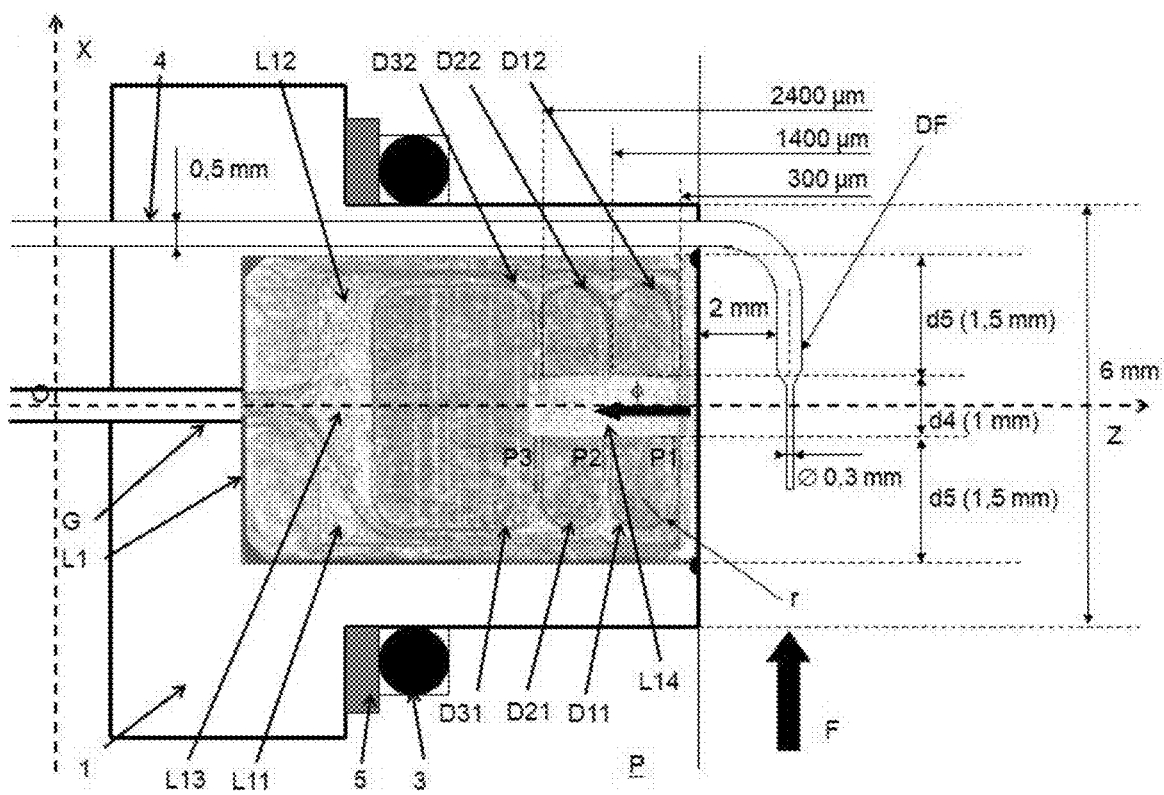
FIG. 2A.
Figure 2B:
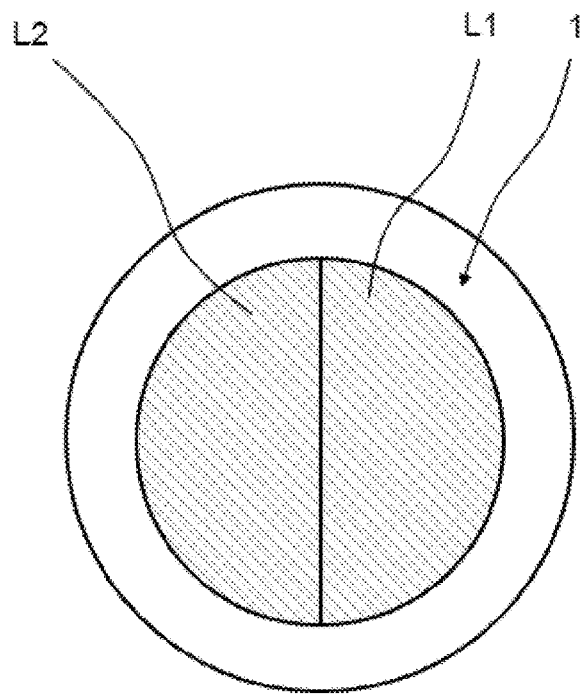
FIG. 2B depict a particular temperature measurement device included in a prior art heat exchange coefficient determination system.

FIGS. 1 to 2B have been described in the "prior art" part of the present description and will not be returned to here.

FIGS. 3 to 8 depict embodiments and variants of a temperature measurement device included in a heat exchange coefficient determination system according to the invention. Each of the embodiments and variants may form a heat exchange coefficient determination system by integrating a computer 20 (represented in FIG. 9) adapted to calculate a temperature value $T_P$ of the wall and a heat flow density φ and then a heat exchange coefficient h on the basis of values of temperature measured in the three measurement planes and in the fluid, as explained hereinafter.

Moreover, FIGS. 3 to 8 are depicted with reference to a wall, for example a pipe wall or an exchanger wall. Instead of a wall, the device may be assembled to any other support suitable for determining a coefficient of exchange between said support and a fluid.

Figure 3:
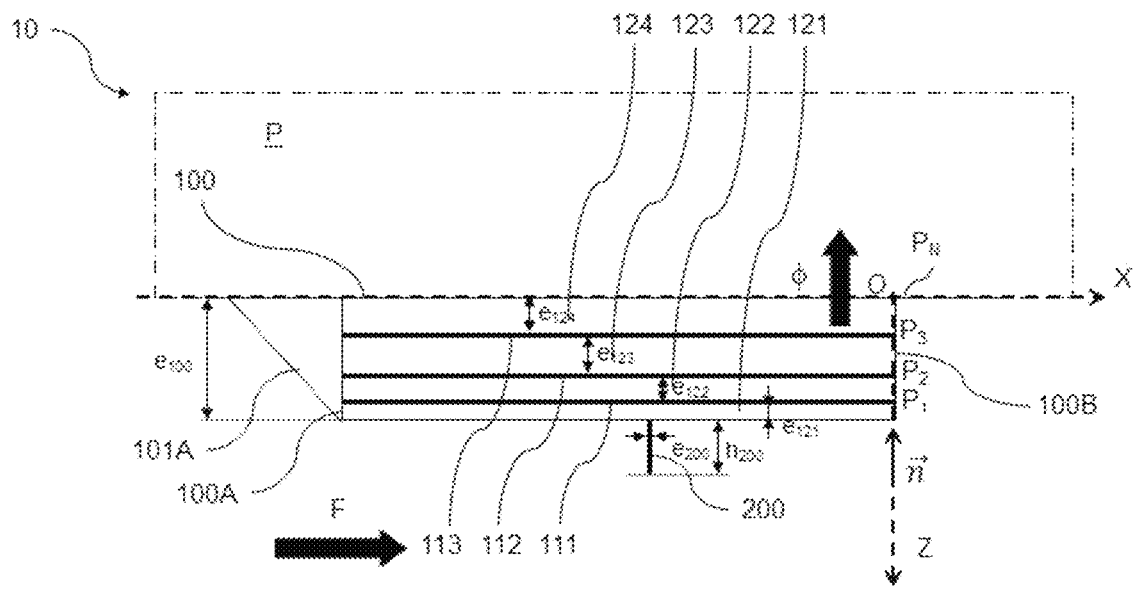
FIG. 3 schematically depicts a temperature measurement device included in a heat exchange coefficient determination system according to the invention.

FIG. 3 depicts schematically a temperature measurement device included in a heat exchange coefficient determination system according to the invention. The measurement device is disposed on an interior wall P of a pipe. A fluid circulates inside the pipe. The thickness of the wall may be a few millimeters, for example between 1 and 5 mm, or even between 1 and 3 mm, or even between 1 and 2 mm. Alternatively, the thickness of the wall may be around ten millimeters or more, depending on the intended application.

The temperature measurement device 10 is depicted in longitudinal section on a reference plane XZ. The longitudinal direction X corresponds to the main direction of flow of the fluid F and the direction Y is the transverse direction. The direction Z perpendicular to the plane XY corresponds to the direction of the heat flow Φ in the wall P and in the device 10.

The temperature measurement device comprises a multilayer structure 100 that is depicted in a non-limiting parallelepipedal form and includes:
four thin ceramic layers 121, 122, 123, 124; and
three metal tracks 111, 112, 113;
each track being positioned between two thin ceramic layers and being integrated into the thickness of one of the two layers.

The structure depicted comprises three metal tracks and four thin layers.

Alternatively, the multilayer structure may comprise more than three metal tracks and in that case more than four thin layers. This makes it possible to improve the dynamic value and/or measurement accuracy of the exchange coefficient and also to verify the axial direction of the flow of heat (in the perpendicular direction Z) compared to the heat penetration behavior law (Fourier law) and detection of any spurious heat flows.

The ceramic layer nearest the wall (which may form a layer in contact with the wall), termed the "interior layer", is the layer 124.

The ceramic layer farthest from the wall (or closest to the fluid), termed the "exterior layer", is the layer 121.

The various ceramic layers are not necessarily the same thickness (dimension in direction Z). The thicknesses $e_{121}$, $e_{122}$, $e_{123}$, $e_{124}$ of the ceramic layers typically vary between 100 and 300 μm, preferably between 100 and 200 μm. The interior layer 124 generally has a thickness $e_{124}$ of at least 150 μm.

The thickness of the layers enables definition of the distances between the metal tracks 111, 112, 113 and therefore the various measurement planes $P_1$, $P_2$ and $P_3$.

The ceramic or ceramics selected for forming the thin layers preferably have a conductivity $\lambda'$ and/or a diffusivity $\alpha'$ close to the conductivity $\lambda$ and/or the diffusivity $\alpha$ of the wall in order to minimize the thermal effects of the presence of the measurement device (to minimize thermal intrusion). It may be alumina ($Al_2O_3$), zirconia ($ZrO_2$), an alumina/zirconia composite material, aluminum nitride (AlN), silicon nitride ($Si_3N_4$), beryllium oxide BeO, in particular when the wall is made of stainless steel.

The various ceramic layers are preferably all made of the same material, in particular one of the materials cited hereinabove, in order to facilitate the manufacture of the device and for improved thermal behavior.

Alternatively, the various ceramic layers may be made of different ceramic materials, in particular a plurality of the materials cited hereinabove.

Each metal track is connected to an electric power supply means and to a resistance measurement means in such a manner as to form a resistive temperature probe. The electrical connections are not represented in FIG. 3 but an example of an electrical connection can be seen in FIG. 4A and is described hereinafter.

Each metal track 111, 112, 113 forms a measurement plane $P_1$, $P_2$, $P_3$, the measurement planes being parallel to one another (relative to the reference plane XY) and aligned in the direction Z perpendicular to the plane XY. In accordance with the invention, the term "aligned" means that the tracks are offset between them only in the direction Z, and that there is no offset between the tracks in the directions X and Y.

The metal tracks enable representative temperature measurements of the wall, that may be termed "wall temperature" hereinafter, in the various measurement planes.

The intersection of the measurement planes $P_1$, $P_2$ and $P_3$ and the surface $P_N$ of the wall with a linen normal to the plane XY forms aligned points.

Each metal track acts as a temperature-sensitive resistance, the variation of which is given by the law:

[Math. 1]

$$R(T)=R(T_0)\times(1+\alpha(T-T_0))=R(T_0)+R(T_0)\times\alpha(T-T_0)$$

in which α is the temperature coefficient of the conductive metal constituting the track.

The temperature difference ΔT corresponding to $T-T_0$ is deduced by measuring the resistance R(T) and knowing the given initial resistance $R(T_0)$ for an initial temperature $T_0$.

At least one metal track is preferably configured to form a high-sensitivity resistive temperature probe. To this end the material, the length and/or the section of the metal track may be varied. This enables compensation of the small thickness of the device and in particular the short distances between the measurement planes.

The sensitivity of a temperature sensor enables characterization of the output magnitude value of said sensor as a function of the temperature to be measured. In the case of a resistive temperature probe the output magnitude is the variation of the resistance and the sensitivity is defined as being the variation of the resistance (or ohmic variation) as a function of a temperature variation. The sensitivity is a function of the temperature coefficient (the higher a, the greater the impact of a ΔT on the resistance variation) but also the initial resistance $R(T_0)$.

For a resistive temperature probe in accordance with the invention a high sensitivity corresponds to a sensitivity greater than or equal to 0.3 Ω/° C. At least one metal track preferably has a sensitivity greater than or equal to 1.3 Ω/° C.

At least one metal track is preferably configured to form an initial resistance $R(T_0)$ greater than or equal to 300 Ω.

The combination of high-sensitivity resistive temperature probes with appropriate characteristics of the ceramic layers (material, thickness, . . . ) enables further compensation of the small thickness of the device and in particular the short distances between the measurement planes.

Moreover, the use of discrete temperature measurements in a measurement algorithm implemented in the computer 20 and made possible by acquisition systems with 16-bit or 24-bit coding, associated with the high sensitivity of the tracks and with the characteristics of the ceramic layers, enables further improvement of the measurement sensitivity. For example, with such coding the discrete temperature values enable detection of very small temperature variations exactly like that which may exist between $P_1$ and $P_2$. By way of example, on a scale of 400° C., a 16-bit discretization enables detection of a temperature difference of: $400/2^{16}$ i.e. 0.006° C. (400/65636).

A metal suitable for producing high-sensitivity resistive temperature probes is platinum (Pt), which has a high temperature coefficient α (3.85×10⁻³ Ω/° C.) and a high resistivity ρ (of the order of 100×10⁻⁹ Ω·m at room temperature).

The aim is to obtain a platinum track having a high resistance, for example substantially equal to 1000 Ω (of the PT1000 type) so that the term $R(T_0) \times \alpha$ is equal to 3.85 Ω/° C., which enables a very high temperature measurement sensitivity to be obtained.

A given resistance value can be obtained by varying the total length $L_{111}$ of the track and the section $S_{111}$ of the track, the resistance being determined by the formula:

$$R(T_0) = \rho \times \frac{L_{111}}{S_{111}} \qquad \text{[Math. 2]}$$

Materials other than platinum may be used, such as silver (Ag), nickel (Ni) or a metal alloy.

The various tracks are preferably made of the same material, preferably chosen from one or more of the materials cited hereinabove.

Alternatively, the various tracks are made of different metals, preferably chosen from one or more of the materials cited hereinabove.

Figure 4A:
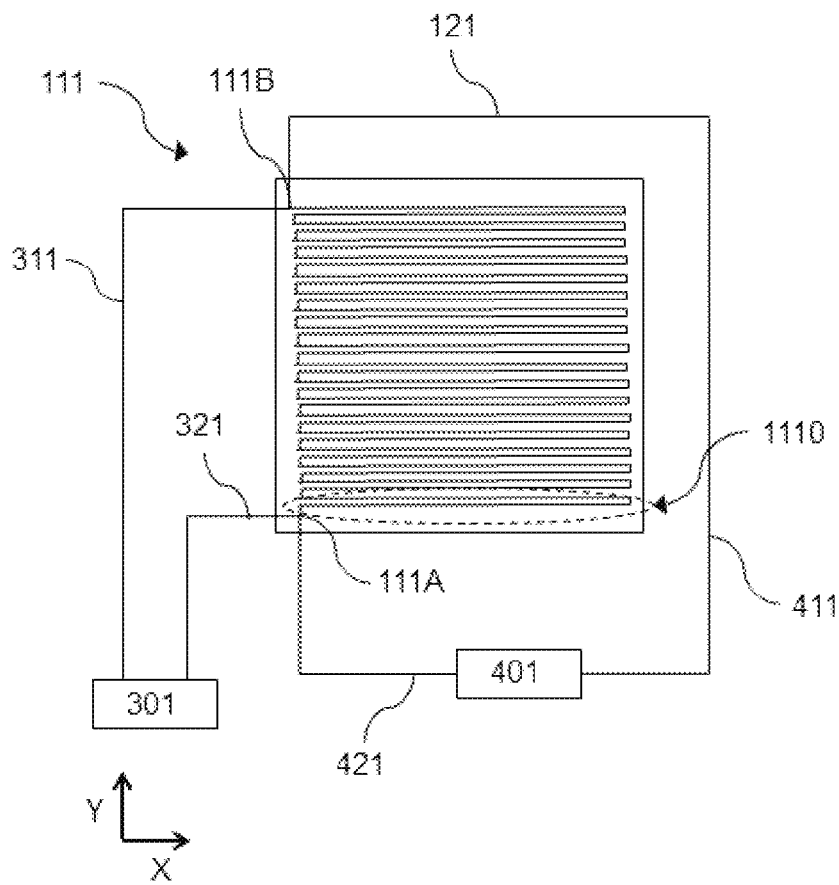
FIG. 4A.
Figure 4B:
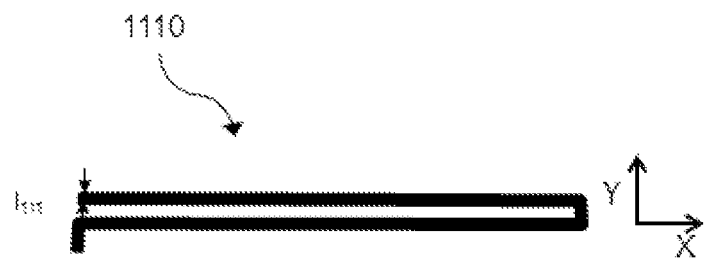
FIG. 4B.
Figure 4C:
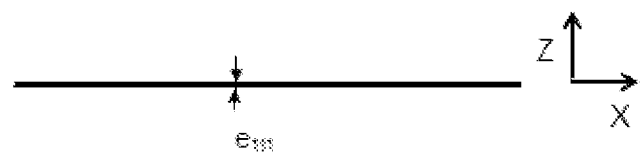
FIG. 4C depict an example of a metal track forming a resistive probe of a temperature measurement device included in a heat exchange coefficient determination system according to the invention.

FIGS. 4A, 4B (seen from above in the plane XY) and 4C (seen from the side in the plane YZ) depict an example of a metal track 111 enabling a resistive temperature probe to be obtained. The metal track takes the form of a serpentine continuous wire forming a serpentine resistance comprising a series of interconnected meanders 1110. This configuration is represented schematically and its objective is to explain the principle. More or less complex configurations may be provided. The ends of the tracks may be disposed at locations other than the corners.

The continuous wire has a width $l_{111}$ (dimension in direction Y) and a thickness $e_{111}$ (dimension in direction Z) forming a section $S_{111}$ equal to $e_{111} \ast l_{111}$ for example 100 μm*4 μm i.e. 0.4×10⁻⁹ m². With the resistivity of platinum being of the order of 100×10⁻⁹ Ω·m, it is seen that a total track length $L_{111}$ of 4 meters is needed to form a resistance of 1000 Ω.

It may be difficult to form a resistance of 1000 Ω in some configurations, in particular for a measurement device of very small size. Also lower resistances may be envisaged, for example between 700 and 800 Ω, or even less.

Moreover, the metal track 111 is connected to an electrical power supply means 301 and to a resistance measurement means 401 by a 4-wire connection which is more accurate than a 2-wire or 3-wire connection known for the measurement of a resistance. In other words, each of the two ends 111A, 111B of the serpentine resistances connected on the one hand to the electrical power supply means 301 via power supply circuit 311, 321 and on the other hand to the resistance measurement means 401 via a measurement circuit 411, 421, that is to say by two distinct circuits. The measurement means is typically a voltmeter the impedance of which is very high so that it does not disturb much or at all the measurement of the resistance and the voltmeter is connected to the terminals of the resistance to minimize the resistance of the measurement circuit. A 4-wire connection of each metal track therefore advantageously enables improved accuracy of the measurement of the resistance and therefore of the temperature.

Because of the small thicknesses of the ceramic layers, and each metal track being integrated into the thickness of a ceramic layer, the multilayer structure may have a very small thickness, of one millimeter or less. For example, the thickness $e_{100}$ of the multilayer structure 100 may be 0.6 millimeter (for example with 4 layers each of 150 μm).

The other dimensions (width $l_{100}$ and length $L_{100}$) of the multilayer structure 100 may be of the order of around ten millimeters to a few tens of millimeters. For example, the multilayer structure may have a width $l_{100}$ of 10 mm and a length $L_{100}$ of 20 mm or a width $l_{100}$ of 16 mm and a length $L_{100}$ of 32 mm.

The small thickness of the multilayer structure and therefore of the temperature measurement device makes it possible to dispose the device on thin walls (a few millimeters thick) and/or in confined areas. Moreover, this makes it possible to avoid any mechanical intrusion of the device into the wall, in particular in order to guarantee the integrity thereof, and to limit thermal skew. The device may be integrated with no modification of the wall being necessary. The device may for example simply be glued to the wall, with a glue adapted to withstand the temperatures at which the device is used (which can be as high as 1000° C.), for example a zirconia ceramic alloy glue (a few micrometers thick), or using an appropriate adhesive.

The first end 100A of the multilayer structure 100, which is that facing the flow of fluid, can be extended by a bevel shape 101A which enables progressive reduction of the thickness of said structure at the level of this end and which is moreover free of metal tracks, and may also be free of ceramic layers. This bevel shape has the effect of reducing turbulence at the fluid/device interface, which turbulence has a direct influence on the exchange coefficient. This kind of bevel shape makes it possible to limit the effect of the singularity consisting of the end of the multilayer structure (leading edge), which is already limited because of the small thickness of that structure. A bevel shape may also be provided at the level of the second end 100B.

The temperature measurement device 10 further comprises a resistive temperature probe 200, termed the "fluid probe", intended to be in contact with the fluid. The fluid probe is assembled to the outer ceramic layer 121, for example welded or brazed to it.

The fluid probe 200 is preferably made of platinum (Pt). It may be made of the same material as one of the metal tracks or a different material.

For example, the fluid probe may have a height $h_{200}$ (dimension in direction Z) of a few millimeters, for example 2 mm, and a thickness $e_{200}$ (dimension in direction X) of one millimeter or less, for example 0.9 mm.

Although not represented, the fluid probe is also connected to an electrical power supply means and to a resistance measurement means, preferably by a 4-wire connection.

For example, the fluid probe may be a platinum probe having a resistance of 100 Ω (PT100).

The person skilled in the art will know how to produce a multilayer structure using a high temperature cofired ceramic (HTCC) or a low temperature cofired ceramic (LTCC) technique, integrating the metal tracks between the ceramic layers, said tracks being metallized using vias through the ceramic layers. This kind of technique is known in the microelectronic field (in particular in MEMS).

Such recourse to the low or high temperature cofired ceramic thin layers technique, close to the MEMS technology, enables production of a wafer containing a great number of structures (typically around fifty structures per wafer). The wafer can therefore be cut up to form a plurality of multilayer structures. Each structure can then be machined, drilled for the electrical connections and/or brazed/welded to integrate the fluid probe. This makes it possible to reduce the unit cost of a device and also to reduce the manufacturing lead time.

Figure 5:
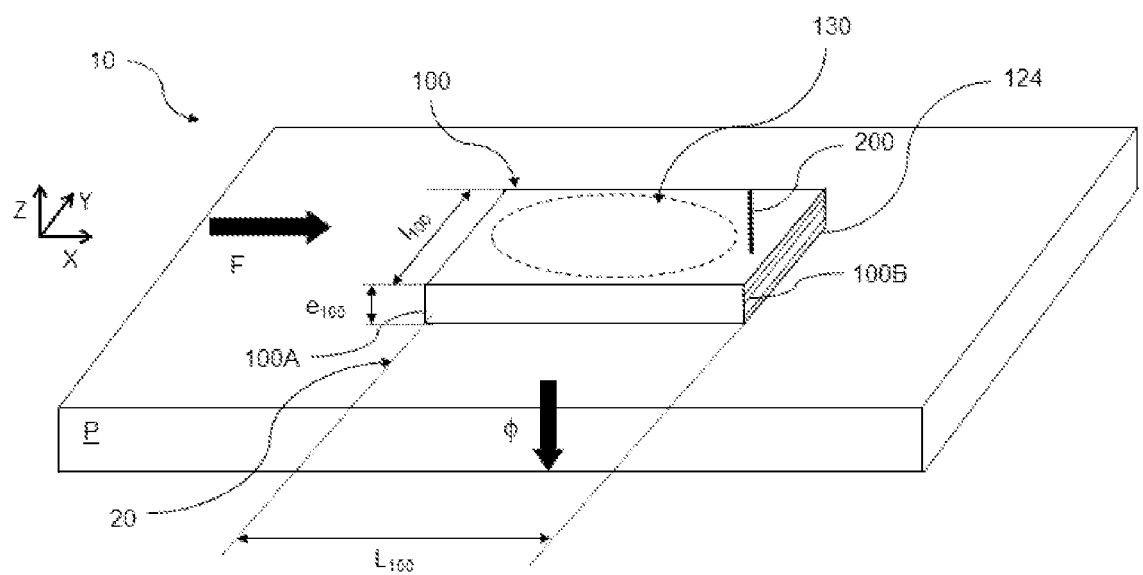
FIG. 5 illustrates a first embodiment of a temperature measurement device included in a heat exchange coefficient determination system according to the invention.

FIG. 5 depicts a first embodiment of a temperature measurement device included in a heat exchange coefficient determination system according to the invention.

Figure 6:
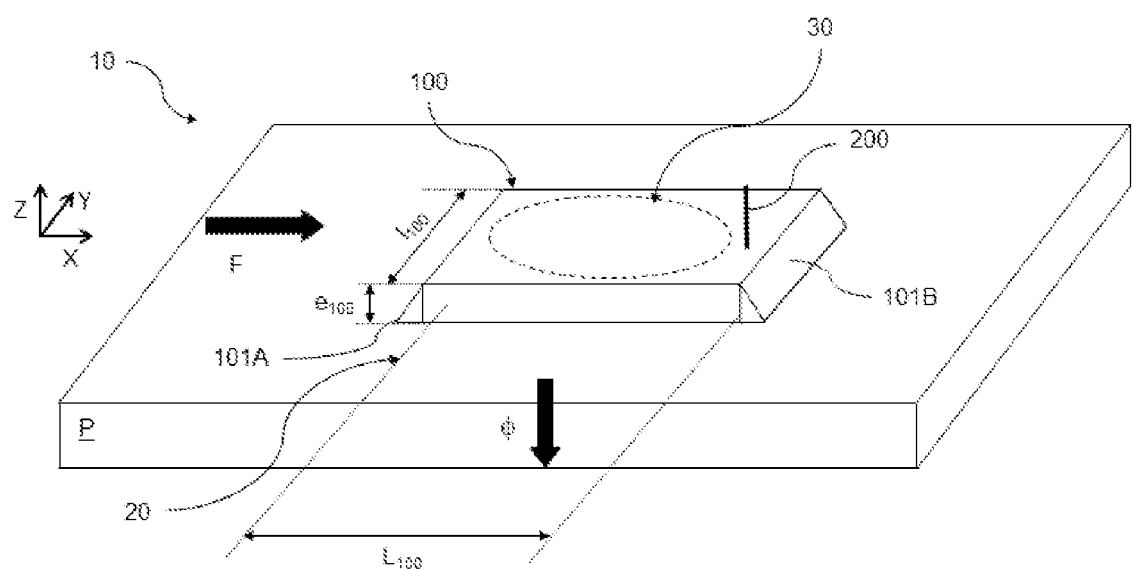
FIG. 6 depicts a second embodiment of a temperature measurement device included in a heat exchange coefficient determination system according to the invention.

FIG. 6 depicts a second embodiment of a temperature measurement device included in a heat exchange coefficient determination system according to the invention.

The devices in accordance with the first and second embodiments each comprise a multilayer structure 100 and a fluid probe 200 such as those described with reference to FIG. 3. In FIGS. 5 and 6 there is identified a zone 130 for measurement of the wall temperatures via the metal tracks that corresponds to a central zone in the multilayer structure, in which zone the temperature measurements are not impacted by structure edge effects.

In the devices in accordance with the first and second embodiments, the inner ceramic layer 124, which is the closest to the wall P, forms a contact layer with said wall. The thickness of this inner layer is at most 150 μm. All the ceramic layers, including this inner layer, have the same dimensions in plan, that is to say the same lengths and widths, and are aligned the one above the other in the direction Z.

The inner ceramic layer 124 may equally be used to route the electric circuits of the resistive temperature probes (metal tracks and fluid probe). The inner ceramic layer 124 is assembled to the wall, for example by gluing it thereto using a glue adapted to withstand the temperatures at which the device is used or again using an adhesive system appropriate to the temperatures at which the device is used.

The second embodiment differs from the first embodiment in that the first and second ends 100A, 100B of the multilayer structure 100 in the longitudinal direction X are extended by a bevel shape 101A, 101B enabling progressive reduction of the thickness of said structure at the level of these two ends. The metal tracks are not extended in this beveled part, which may equally be free of ceramic layers. As described above, this bevel shape has the effect of reducing turbulence at the fluid/device interface, which turbulence can influence the determination of the exchange coefficient. This kind of bevel shape makes it possible to limit the effect of the singularity consisting of the end of the structure (leading edge), which is already limited because of the small thickness of that structure.

Figure 7:
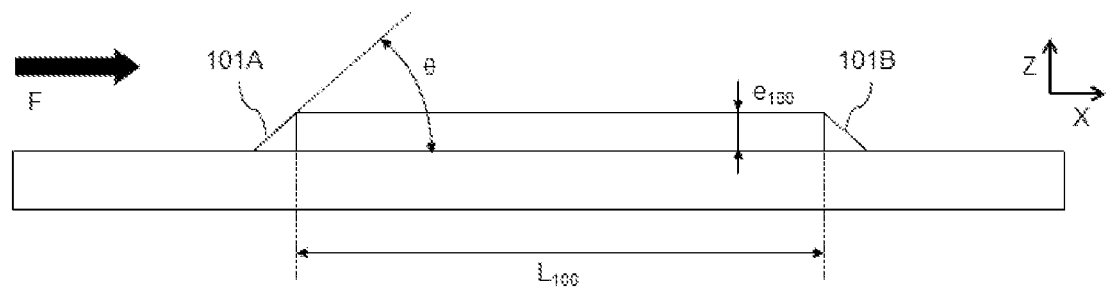
FIG. 7 depicts a first variant of the second embodiment.

FIG. 7 depicts a first variant of the second embodiment in which the bevel shape extended end 101A, 101B are beveled over all of the thickness of the multilayer structure 100. The bevel shape may be obtained by surplus glue, for example the glue used to assemble the multilayer structure 100 to the wall. Alternatively, the bevel shape may be formed during production of the multilayer structure or during cutting of the multilayer structures from a wafer.

Figure 8:
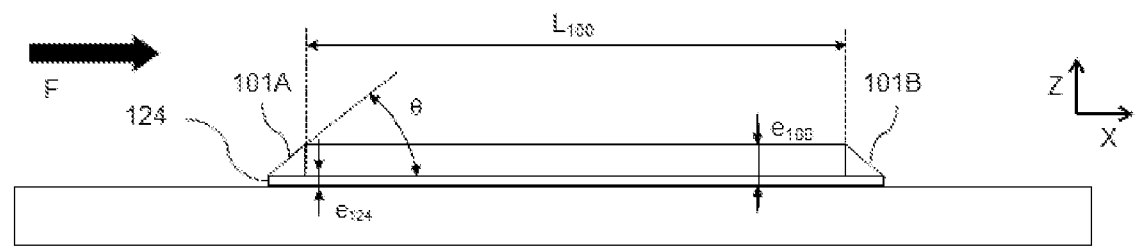
FIG. 8 depicts a second variant of the second embodiment.

FIG. 8 depicts a second variant of the second embodiment in which the bevel shape extended ends 101A, 101B are beveled from the inner ceramic layer 124. As in the first variant, the bevel shape may be obtained by surplus glue or may be formed during production of the multilayer structure or during cutting of the multilayer structures from a wafer.

In each of the two variants the bevel angle θ may vary between 45 and 60°.

Figure 9:
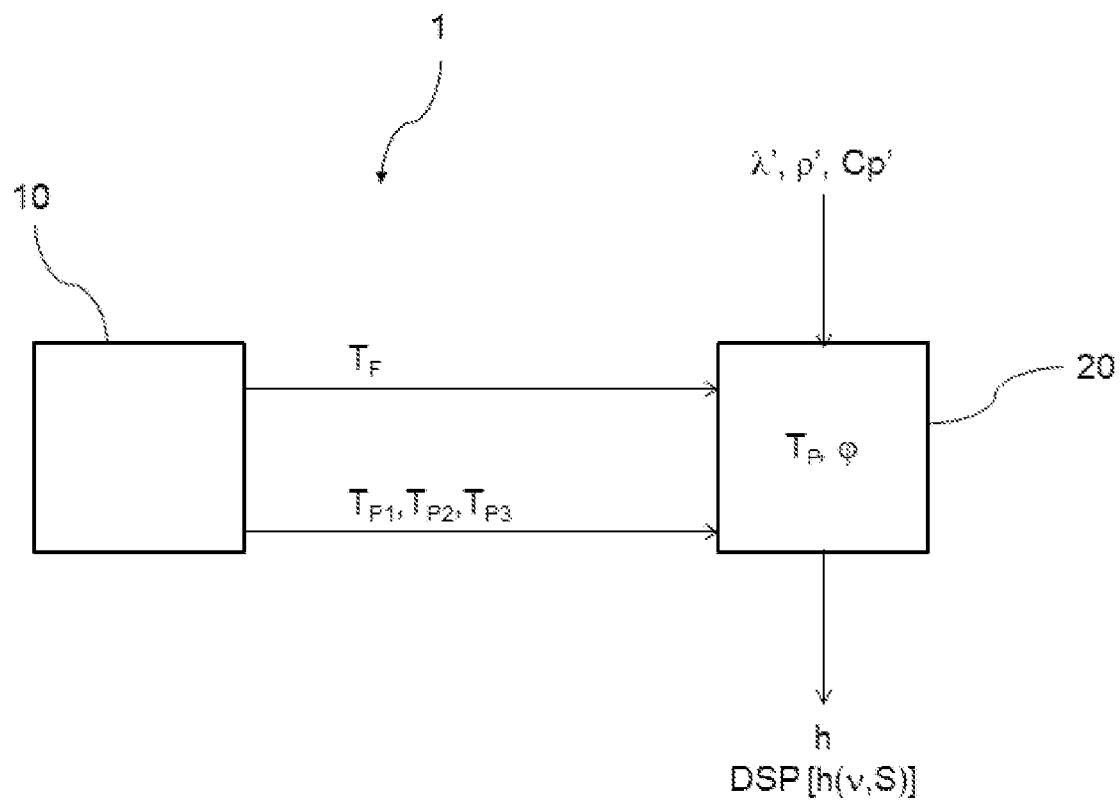
FIG. 9 represents a block diagram of a heat exchange coefficient measurement system according to the invention.

FIG. 9 represents a block diagram of a heat exchange coefficient determination system 1. The heat exchange coefficient determination system comprises a temperature measurement device 10 in accordance with the invention and a computer 20 that executes a calculation algorithm configured to calculate the heat exchange coefficient from temperature measurements delivered by the measurement device 10 and data such as the thermal conductivity λ', the mass per unit volume p' and/or the thermal capacity Cp' of the measurement device.

The principles of this algorithm will now be described.

Before measuring the wall temperatures there is generally carried out a step of calibration of the resistive probes formed by the metal tracks. As there are at least 3 metal tracks enabling provision of at least 3 distinct measurement planes parallel to one another, such calibration may be carried out using only the components of the device, that is to say without it being necessary to add external elements: the expression auto-calibration is then used. We are going to describe the principle of this auto-calibration step with 3 metal tracks, it being understood that it may be carried out with more than 3 metal tracks.

For the measurement, the resistive temperature probes are generally supplied with power at a low voltage causing no self-heating of the resistances by the Joule effect, in order to prevent heating of the resistances causing unwanted increases of said resistances and thus falsifying the wall temperature measurements.

However, for the calibration step the resistance of the median plane $P_2$ may be supplied with power at a voltage higher than that used for the measurement in order to obtain a Joule effect and to verify the responses to this temperature rise of the resistances of the planes $P_1$ and $P_3$. The profiles of the responses of the resistive probes of planes $P_1$ and $P_3$ enable detection of any problems of contact between a resistive probe and the ceramic or verification that the distances between the planes have not changed.

Thus the fact of having 3 resistive probes for the measurement of the wall temperatures has the advantage of enabling auto-calibration by modifying only the power supply voltage of the resistances.

There follow measurements of wall temperatures and measurements of fluid temperature.

At a time t, the temperature measurement device 10 provides a fluid temperature measurement $T_F$ delivered by the fluid probe 200 and at least three temperature measurements $T_{P1}$, $T_{P2}$ and $T_{P3}$ in three measurement planes $P_1$, $P_2$ and $P_3$ delivered by the respective metal tracks 111, 112 and 113.

There is considered a normal line $\vec{n}$ substantially corresponding to the direction Z, as represented in FIG. 3, but whose the direction is directed from the fluid F to the wall P. The intersection of the measurement planes $P_1$, $P_2$ and $P_3$ with this normal line forms points substantially aligned in the direction Z, corresponding to the same abscissa x in the direction X as represented in FIG. 3.

The temperatures $T_F(t, x)$, $T_{P1}(t, x)$, $T_{P2}(t, x)$ and $T_{P3}(t, x)$ are transmitted to the computer 20.

From the temperatures $T_{P1}(t, x)$, $T_{P2}(t, x)$ and $T_{P3}(t, x)$ the computer 20 calculates the wall temperature $T_P(t, x)$ by an inverse conduction method such as the Beck method, and also calculates the thermal flow density $\varphi(t, x)$. The temperatures $T_F(t, x)$, $T_{P1}(t, x)$, $T_{P2}(t, x)$, $T_{P3}(t, x)$, $T_P(t, x)$ will be designated hereinafter $T_F$, $T_{P1}$, $T_{P2}$, $T_{P3}$, $T_P$.

The measurement of the heat flow density $\varphi(W/m^2)$ is obtained by measuring the temperature gradient using the measurements $T_{P1}$, $T_{P2}$, $T_{P3}$:

[Math.3]

$$\vec{\varphi} \cdot \vec{n} = -\lambda' \overrightarrow{\mathrm{Grad}} T \cdot \vec{n}$$

where $\lambda'$ is the conductivity of the device (W/m/K) and Grad T is the temperature gradient (° C./m or K/m) in the device in the direction Z and is itself expressed in the form:

$$\text{Grad } T = \frac{\Delta T}{\Delta z} \quad \text{[Math. 4]}$$

Although, in a permanent regime, two planes for measurement of the wall temperatures are sufficient to determine a heat flow density, in a dynamic regime (temperature step type transient, pulse, sinusoidal fluctuations), it is preferable to have at least three measurement planes to characterize the frequency of the fluctuation or the response time in a temporal representation.

Measurement with 3 measurement planes further makes it possible to be able to provide complementary information on the diffusion of heat in the measurement device. By comparing the temperature gradients between $P_1$ and $P_2$, $P_2$ and $P_3$, $P_1$ and $P_3$ it is possible to evaluate how heat is diffused using the formulas:

$$\text{Grad } T_{1-2} = \frac{T_{P2} - T_{P1}}{z_2 - z_1} \quad \text{[Math. 5]}$$

$$\text{Grad } T_{2-3} = \frac{T_{P3} - T_{P2}}{z_3 - z_2} \quad \text{[Math. 6]}$$

$$\text{Grad } T_{1-3} = \frac{T_{P3} - T_{P1}}{z_3 - z_1} \quad \text{[Math. 7]}$$

The various temperature gradients can then be compared with one another and, if these temperature gradients are substantially equal, it is possible to conclude that neither heat sinks nor heat sources are disturbing the measurement of the heat flow. This is referred to as a purely 1D situation.

In the case of pure convection, the thermal flow density by conduction in the device is equal to the flow density transferred by convection between the fluid and the device:

[Math.8]

$$\vec{\varphi} \cdot \vec{n} = -\lambda' \overrightarrow{\text{Grad}} T \cdot \vec{n} = h(T_F - T_P)$$

The heat exchange coefficient h(t, x), which will be designated h (in W/m²/K), is then deduced using the equation:

[Math.9]

$$h = \varphi/(T_F - T_P)$$

In the case of convection plus non-negligible radiation, the heat flow density is given by the formula:

[Math.10]

$$\vec{\varphi} \cdot \vec{n} = -\lambda' \overrightarrow{\text{Grad}} T \cdot \vec{n} = h(T_F - T_P) \pm \varepsilon' \sigma (T_0^4 - T_P^4)$$

where $T_0$ is the reference temperature for the radiation, $\varepsilon'$ the emissivity of the device (from 0 to 1) and $\sigma$ the Stephan-Boltzmann constant ($5.67 \times 10^{-8}$ W/m²/K⁴).

The emissivity of the device is generally chosen to be close or equal to that of the wall.

The radiation term may appear as +/− because either the device radiates (the term is +) or the device is subjected to radiation (the term is −).

The computer 20 may integrate a first complementary module enabling discrimination of radiation and convection and isolation of the convective heat exchange coefficient h.

The exchange coefficient h for the transfer of heat by convection between the fluid and a wall is independent of the material, both of the material of the measurement device and that of the wall. This means that the device made mainly of ceramic will measure the same exchange coefficient as that of the wall, with identical local flow conditions. The surface state of the device characterized by its roughness is preferably chosen to be similar to the surface state of the wall so as to be able to ensure that the exchange coefficient is unchanged between the wall and the device. Note that for radiation the characteristics of the surface state (roughness, but also color) participate in the transfer of heat through the term Ea, the emissivity c also depending on the temperature of the surface, which makes it necessary to measure it and to use tables of emissivity or to qualify this parameter. This may be integrated into the first complementary module.

Within the wall, the heat flow density may differ according to whether the wall is equipped with the device or not, because of the thermal resistance differences. This difference remains small, given the small thickness of the device. However, the computer 20 may integrate a second complementary module enabling estimation of the heat flow density delta caused by the presence of the device on the wall.

The algorithm is therefore able to offer, at the output of the computer 20, as a function of time and at a considered point with abscissa x:

the temperature of the fluid (mean and standard deviation);

the temperature of the wall at the level of the plane $P_1$ (mean and standard deviation);

the temperature of the wall at the level of the plane $P_2$ (mean and standard deviation);

the temperature of the wall at the level of the plane $P_3$ (mean and standard deviation);

the temperature of the wall (mean and standard deviation);

the heat flow density by conduction in the device and/or by radiation;

the estimated heat flow density by conduction in the wall corrected for the presence of the device;

the temperature gradients in the device;

the heat exchange coefficient h (mean and standard deviation).

The data delivered by the computer 20 is preferably expressed in the frequency domain. Thus the computer 20 preferably delivers the power spectral density DSP[h(v, x)] based on the Fourier transform of the exchange coefficient h(t, x).

The computer is then able to calculate, for each frequency step v, the following expression:

$$DSP[h(v, x)] = \frac{DSP[\varphi(v, x)]}{DSP[\Delta T(v, x)]} \quad \text{[Math. 11]}$$

where $$DSP[\Delta T(v, x)] = DSP[T_F(t, x) - T_P(t, x)](v, x) \quad \text{[Math. 12]}$$

The algorithm provides an option whereby the determination of the power spectral density DSP[ΔT] is calculated assuming the measurement signals are representative of the temperatures $T_F$ and $T_P$ with no phase shift (synchronous signals).

In this case, the power spectral density DSP[ΔT] is written:

[Math.13]

$$DSP[\Delta T(v,x)] = DSP[T_F(v,x) - T_P(v,x)]$$

The algorithm is able to determine a coherence function or intercorrelation function in a spectral representation, that is an estimate of the uncertainty of the exchange coefficient value.

As indicated above, the temperature measurement device in accordance with the invention enables reduction of the thickness a heat exchange coefficient determination system. For example, the three temperature measurement planes $P_1$, $P_2$ and $P_3$ may respectively be disposed at a distance of 0.1, 0.3 and 0.5 mm relative to the fluid. The low mass and the small dimensions of the device ensure non-intrusion in measurement for a thick wall or greatly reduce the intrusion for a thin wall.

The distances between the measurement planes being small, the temperature difference measured is also small. This is compensated by an increased sensitivity of the temperature measurement using appropriate metal tracks combined with appropriate characteristics of the ceramic layers and possibly with the use of discrete temperature measurements in the algorithm by acquisition systems using 16-bit or 24-bit coding.

Ceramics are preferably chosen having conductivities λ' between 0.062 and 230 W/m²/K which leaves a relatively wide range of choice for the best response to various applications enabling a range of measurement devices to be designed with different diffusivities α'.

As a reminder, a diffusivity α is related to the thermal conductivity λ, the mass per unit volume ρ, and the thermal capacity Cp by the equation:

$$\alpha = \frac{\lambda}{\rho C p} \quad [\text{Math. 14}]$$

Examples of ceramics are given in the table below (compared to stainless steel in the bottom line):

TABLE 1

| Ceramic | Conductivity λ W/m/K | Mass per unit volume ρ kg/m3 | Specific heat Cp J/kg/K | Diffusivity (m²/s) |
|---|---|---|---|---|
| $Al_2O_3$ | 24 to 12 (25° C. to 300° C.) | 3740 | 750 | $8.55 \times 10^{-6}$ to $4.28 \times 10^{-6}$ |
| $Al_2O_3/ZrO_2$ | 27 to 16 (25° C. to 300° C.) | 400 | 720 | |
| AlN-230 | 230-145 | 3300 | 720 | $9.68 \times 10^{-5}$ |
| AlN-170 | 180-120 (25° C. to 300° C.) | 3300 3300 | | |
| $Si_3N_4$ (SN90) | 85 (25° C.) | 3220 | 680 | |
| Vermiculite | 0.062 | 2500 | 1080 | |
| 304L stainless steel | 16 | 8320 | 460 | $4.46 \times 10^{-6}$ |

Thus the invention enables a plurality of temperature measurement device models to be defined and thus a plurality of heat exchange coefficient determination system models, for example to take into account diverse configurations of heat transfer, as described in the following three examples. First configuration example: measurement in a thin wall under a permanent regime, high heat flow density φ.

Figure 10A:
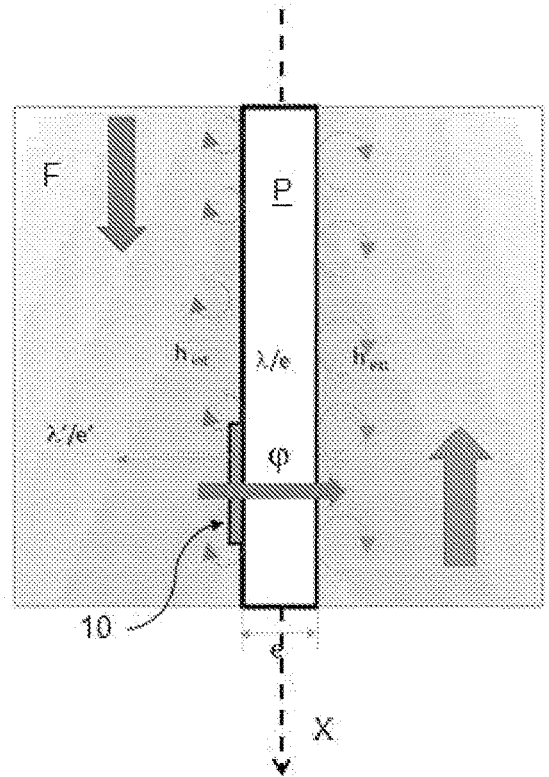
FIG. 10A.
Figure 10B:
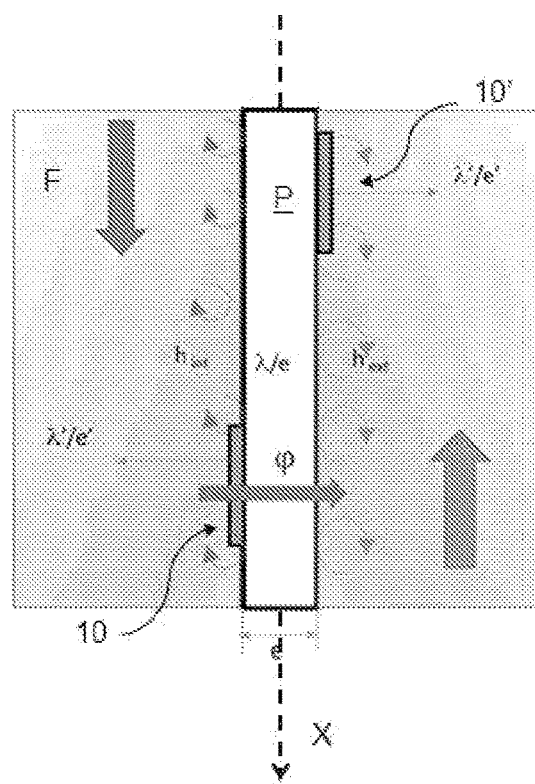
FIG. 10B depict a first example of a configuration of use of a heat exchange coefficient measurement system according to the invention.

This first configuration example is illustrated in FIGS. 10A and 10B.

This may be a configuration with a high flow of heat in a thin heat exchanger wall.

This configuration may apply to plate-type or tube-type exchangers in which, by design, the wall that separates the two fluids is as thin as possible to reduce the thermal resistance of the wall. The walls generally have a thickness between 1 and 3 mm depending on the fluid pressure conditions.

The global exchange coefficient $h_{global}$ (with the device) may be determined using the formula:

$$\frac{1}{h_{global}} = \frac{1}{h_{int}} + \frac{e}{\lambda} + \frac{e'}{\lambda'} + \frac{1}{h_{ext}} \quad [\text{Math. 15}]$$

where e and λ are respectively the thickness and the conductivity of the wall, e' and λ' are respectively the thickness and the conductivity of the device, $h_{int}$ is the exchange coefficient of the hot wall or internal wall, and $h_{ext}$ is the exchange coefficient of the cold wall or external wall.

With the benefit of a high heat flow density, this configuration may be measured efficiently, preferably by using a ceramic material having a thermal conductivity λ' close to the thermal conductivity λ of the wall (favorable in a permanent regime) and/or a diffusivity α' close to the diffusivity α of the wall (favorable under dynamic conditions). This makes it possible to prevent the thickness of the device, despite its small thickness, impacting the thin wall. Moreover, a measurement device having a surface state and in particular a roughness close to that of the wall is preferable.

The measurement device may be disposed on the hot fluid side wall (hot wall or internal wall) and/or on the cold fluid side wall (cold wall or external wall). In the situation where two devices 10, 10' are disposed (FIG. 10B) one on the hot wall and the other on the cold wall, they are advantageously disposed at two different levels in the longitudinal direction X of the wall to prevent cumulative effects of the two devices and to minimize the skew affecting the heat flow densities.

Under a continuous regime the ΔT measured between two metal tracks is low since the distances of the measurement planes are small, but this effect is compensated by high flows, in addition to the characteristics of the measurement device and of the algorithm that have already been referred to above.

In the example, the distances of the measurement planes, which remember are the distances between the fluid and said planes, are: 100 μm ($P_1$), 304 μm ($P_2$), and 500 μm ($P_3$). The results below are given for alumina ceramic layers, platinum metal tracks. For a heat flow density of 40 kW/m², the difference between the temperatures measured by the device between the planes $P_1$ and $P_2$ is 0.27° C. For a heat flow density of 200 kW/m² the difference between the temperatures measured by the device between the planes $P_1$ and $P_2$ is 1.36° C. Second configuration example: measurement in an insulated wall under a continuous regime, low heat flow φ.

Figure 11:
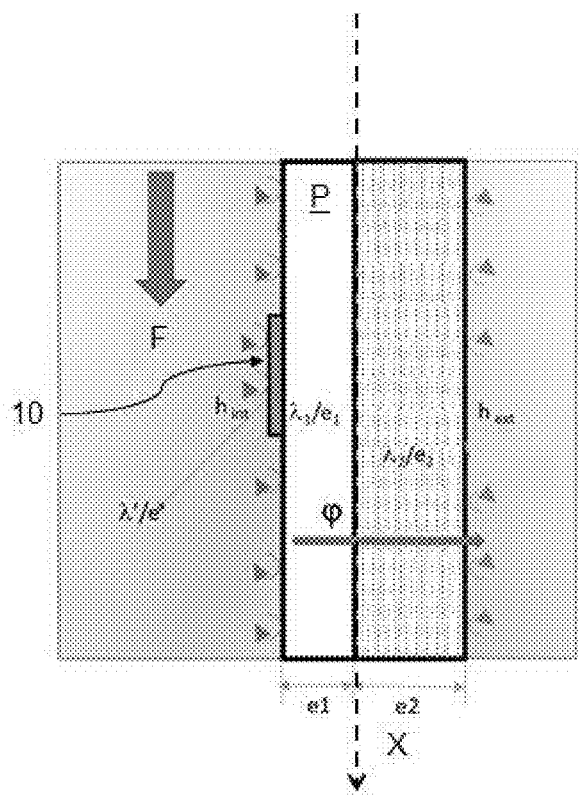
FIG. 11 depicts a second example of a configuration of use of a heat exchange coefficient measurement system according to the invention.

This second configuration example is depicted in FIG. 11.

This may correspond to thermally-insulated thick pipework having for example thicknesses of 10 mm or more.

In the presence of insulation, the global exchange coefficient $h_{global}$ (including the pipework, the external insulation and the measurement device) is low. On the other hand, even under a continuous regime, the internal exchange coefficient $h_{int}$ (between the pipework and the fluid) may be high when the flow of the fluid transfers its heat in accordance with the characteristics of the flow but also through the presence of the insulation, which has an effect on $h_{global}$.

The global exchange coefficient $h_{global}$ is written:

$$\frac{1}{h_{Global}} = \frac{1}{h_{int}} + \frac{e_1}{\lambda_1} + \frac{e_2}{\lambda_2} + \frac{e'}{\lambda'} + \frac{1}{h_{ext}} \qquad [\text{Math. 16}]$$

where $e_1$ and $\lambda_1$ are respectively the thickness and the conductivity of the pipework, $e_2$ and $\lambda_2$ are respectively the thickness and the conductivity of the insulation, e' and λ' are respectively the thickness and the conductivity of the device, $h_{int}$ is the exchange coefficient of the hot wall or internal wall (pipe), and heat is the exchange coefficient of the cold wall or external wall (thermal insulation).

With a low heat flow density under a continuous regime, the temperature measurement device of the invention (thickness of the order of 0.6 mm) disposed on the internal wall has virtually no effect on the heat flow as the thermal conductivity and/or the diffusivity of the ceramic of the device is chosen to be close to that of the pipe.

Alumina has a thermal conductivity and a diffusivity close to those of a stainless steel (304L) wall, so the ceramic layers (and/or the ceramic support) of the device will therefore preferably be made of alumina. Thus, a measurement device 0.6 mm thick made of alumina on insulated 10 mm pipework will behave in the same fashion as the wall, so that this kind of device has low intrusion under a continuous regime.

Third configuration example: measurement under a dynamic regime with high or low heat flow.

Under a dynamic regime two situations may arise:
either the aim is to characterize the dynamics of a system aiming to reproduce a temperature step change or some other thermal load. In this case characterizing the response of the wall to a flow of fluid is not looked for, but rather the characteristic of the thermal load source (pulse, step change, ramp). The measurement device can therefore be much faster than the response of the wall. In this case a ceramic with high thermal conductivity may be used, for example AlN (aluminum nitride), which has a very high thermal conductivity and a very high diffusivity, typically $9.68 \times 10^{-5}$ m/s$^2$ as against $4.5 \times 10^{-6}$ m/s$^2$ for 304L stainless steel. The measurement device may be slightly thicker, of the order of 1 mm thick, to separate the measurement planes and to have a more precise flow density (temperature gradient);

or the aim is to characterize the response of a wall to a temperature step change in order to determine the time constant of the wall. In this case it is necessary to choose a ceramic having a diffusivity close to that of the wall so as to obtain penetration of heat into the wall and into the sensor of the same order of magnitude.

From these three configuration examples it is seen that the temperature measurement device participating in a heat exchange coefficient determination system according to the invention may be adapted as a function of the configurations and/or applications targeted by:

adapting the thickness of the device (in particular adapting that of the multilayer structure, and in particular the thicknesses of the ceramic layers);

adapting the distances between the metal tracks and between the measurement planes;

choosing suitable ceramic materials for forming the thin layers;

choosing suitable metals for forming the metal tracks.

The heat exchange coefficient determination system according to the invention may comprise a remote communication module so as to be able to be connected to a Smartphone or a tablet via a dedicated application.

Among the possible applications of the heat exchange coefficient determination system according to the invention there may be cited:

industrial fields, such as heat exchangers;

housing, air-conditioning fields;

intelligent garments, health, sport, weather, armed services fields . . . .

The various embodiments, variants and examples described may be combined in any technically possible combination.

Moreover, the present invention is not limited to the embodiments described above but extends to any embodiment falling within the scope of the claims.

The invention claimed is:

1. A system for determining a heat exchange coefficient between a fluid (F) and a support (P) at a surface ($P_N$) of the support in contact with the fluid (F), a direction of a fluid flow being parallel to the surface of the support, comprising a temperature measurement device extending in a longitudinal direction (X) parallel to the direction of the fluid flow and comprising:

a multilayer structure including:

at least four thin ceramic layers and at least three metal tracks, each track being positioned between two of the thin ceramic layers and integrated into the thickness of one of said two ceramic layers;

each track being adapted to be connected to an electrical power supply means and to a resistance measurement means so as to form a resistive probe able to measure a temperature ($T_{P1}$, $T_{P2}$, $T_{P3}$) in a measurement plane ($P_1$, $P_2$, $P_3$), the metal tracks thus forming a plurality of measurement planes ($P_1$, $P_2$, $P_3$) parallel to one another and substantially aligned in the direction (Z) perpendicular to the surface ($P_N$); and a resistive temperature probe attached to the multilayer structure and in contact with the fluid (F) so as to measure a fluid temperature ($T_F$);

the system further comprising a computer including:

first means for calculating, from the temperatures ($T_{P1}$, $T_{P2}$, $T_{P3}$) measured by the at least three metal tracks, a mean wall temperature value ($T_P$) and a heat flow density ($\varphi$); and second means for calculating a heat exchange coefficient (h) from the fluid temperature ($T_F$), the mean wall temperature ($T_P$), and the heat flow density ($\varphi$).

2. The system according to claim 1, wherein at least one metal track is configured to form at least one high-sensitivity resistive probe and corresponds to a sensitivity greater than or equal to 0.3 Ω/° C.

3. The system according to claim 1, wherein at least one metal track is configured to form an initial resistance ($R(T_0)$) greater than or equal to 300 Ω.

4. The system according to claim 1, wherein the multilayer structure comprises more than four thin ceramic layers and more than three metal tracks, each track being positioned between two of the thin ceramic layers and being integrated into the thickness of one of the two ceramic layers.

5. The system according to claim 1, wherein at least one metal track is made of platinum, silver, nickel, or a metal alloy.

6. The system according to claim 1, wherein at least one thin ceramic layer is made of alumina ($Al_2O_3$), zirconia ($ZrO_2$), an alumina/zirconia composite material, aluminum nitride (AlN), silicon nitride ($Si_3N_4$), or beryllium oxide (BeO).

7. The system according to claim 1, wherein at least one thin ceramic layer has a thickness less than or equal to 300 μm.

8. The system according to claim 1, wherein a thin ceramic layer intended to be in contact with the surface ($P_N$) of the support has a thickness of at least 150 μm.

9. The system according to claim 1, wherein at least one end of the multilayer structure is extended in the longitudinal direction (X) by a bevel shape enabling progressive reduction of the thickness of said multilayer structure at the level of said end.

10. The system according to claim 9, wherein the at least one end of the multilayer structure is extended by a bevel shape in the longitudinal direction (X) corresponding to the direction of circulation of the fluid (F).

11. The system according to claim 1, comprising the electrical power supply means and the resistance measurement means connected to each metal track.

12. The system according to claim 11, each metal track being connected, on the one hand, to the electrical power supply means via a power supply circuit and, on the other hand, to the resistance measurement means via a measurement circuit by means of the electrical power supply means so as to form a 4-wire connection.

* * * * *